United States Patent
Li et al.

(10) Patent No.: US 8,627,148 B2
(45) Date of Patent: Jan. 7, 2014

(54) METHOD AND APPARATUS FOR MEMORY DUMP PROCESSING AND A MEMORY DUMP SYSTEM

(75) Inventors: Jun Li, Hangzhou (CN); Chao Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 13/340,342

(22) Filed: Dec. 29, 2011

(65) Prior Publication Data

US 2012/0304019 A1 Nov. 29, 2012

Related U.S. Application Data

(63) Continuation of application No. PCT/CN2011/074721, filed on May 26, 2011.

(51) Int. Cl.
*G06F 11/00* (2006.01)
(52) U.S. Cl.
USPC .......................................... 714/38.11; 714/42
(58) Field of Classification Search
USPC ........ 714/38.11, 6.1, 6.11, 6.12, 6.13, 13, 48, 714/54, 718; 712/201, 202
See application file for complete search history.

(56) References Cited

U.S. PATENT DOCUMENTS

| | | | | |
|---|---|---|---|---|
| 5,293,612 A | * | 3/1994 | Shingai .......................... | 711/159 |
| 5,339,406 A | * | 8/1994 | Carney et al. ................... | 714/45 |
| 6,948,010 B2 | * | 9/2005 | Somers et al. .................. | 710/23 |
| 2007/0220350 A1 | | 9/2007 | Ogasawara et al. | |
| 2008/0133968 A1 | | 6/2008 | Muppirala et al. | |
| 2009/0110234 A1 | * | 4/2009 | Yang et al. ..................... | 382/100 |
| 2009/0216967 A1 | * | 8/2009 | Sugawara ....................... | 711/156 |
| 2010/0199071 A1 | | 8/2010 | Nakazono et al. | |

FOREIGN PATENT DOCUMENTS

| | | |
|---|---|---|
| CN | 101025701 A | 8/2007 |
| CN | 101770401 A | 7/2010 |
| CN | 101795381 A | 8/2010 |

OTHER PUBLICATIONS

Office Action issued in corresponding Chinese Patent Application No. 201180000579.6, mailed Oct. 31, 2012.
Extended European Search Report issued in corresponding European Patent Application No. 11768476.1, mailed Jun. 28, 2012.
International Search Report issued in corresponding PCT Patent Application No. PCT/CN2011/074721, mailed Mar. 1, 2012.

* cited by examiner

*Primary Examiner* — Dieu-Minh Le
(74) *Attorney, Agent, or Firm* — Brinks Gilson & Lione

(57) ABSTRACT

The present application provides a method, an apparatus and a system for memory dump processing. The method comprises: invoking a first set of processing units to process a first stage of memory dump processing for each of memory blocks; invoking each set of processing units other than the first set of processing units to process a subsequent processing stage after completing the first stage respectively, to write the memory blocks into a storage device. The technical solutions provided in the present application enable processing each stage for each of the memory blocks in a pipeline manner, avoid instantaneous peak flow of disk I/O transmission and improve memory dump performance.

18 Claims, 5 Drawing Sheets

METHOD AND APPARATUS FOR MEMORY DUMP PROCESSING AND A MEMORY DUMP SYSTEM

CROSS-REFERENCE TO RELATED APPLICATIONS

This application is a continuation of International Application No. PCT/CN2011/074721, filed on May 26, 2011, which is hereby incorporated by reference in its entireties.

FIELD OF THE APPLICATION

The embodiments of the present application relate to a data processing technique, specifically to a method and an apparatus for memory dump processing and a memory dump system.

BACKGROUND OF THE APPLICATION

Operating system often performs memory dump after system crashes to dump data in memory to a storage device for facilitating later fault location. With the development of hardware technique, memory capacity has been greatly expanded, which may lead to a too long time for system dump. Meanwhile, with the development of modern processor technique, single-core processor has been evolved into multi-core multi-thread processor, which is capable of processing multiple threads in parallel simultaneously, that is, the processor has multiple logical CPUs, each of which is a processing unit. However, traditional dump is handled by a single logical CPU, which causes a great waste of the computing power of system.

Some systems in the prior art such as AIX (Advanced Interactive eXecutive), HP-UX (Hewlett Packard Unix), etc provide a function of parallel dump, in which memory is partitioned into blocks and one or more logical CPUs are responsible for the processing operations of various stages for a memory block (such as, pre-processing, filtering, compressing, writing disk) in order to accelerate processing speed. However, since logical CPUs processing respective memory blocks operate in parallel independently from each other, when multiple logical CPUs perform disk I/O transmission simultaneously, instantaneous peak flow of disk I/O transmission may occur, which results in decrease in dump performance. Furthermore, it is necessary for the driver of the storage device to be reentrant in order to assure the concurrent use of the storage device by the multiple logical CPUs.

SUMMARY OF THE APPLICATION

The embodiments of the present application provide a method and an apparatus for memory dump processing and a memory dump system to avoid instantaneous peak flow of disk I/O transmission, and thus improve memory dump performance.

A method for memory dump processing is provided in an embodiment of the present application, comprising:
invoking a first set of processing units to process a first stage of memory dump processing for each of the memory blocks;
invoking each of the sets of processing units other than the first set of processing units to process subsequent processing stages after completing the first stage processing, respectively, to write the memory blocks into a storage device, the subsequent processing stages being a next stage to a processed stage,
wherein each of the sets of processing units correspondingly processes one stage of the memory dump processing.

An apparatus for memory dump processing is provided in an embodiment of the present application, comprising:
a initiating processing module for invoking a first set of processing units to process a first stage of memory dump processing for each of the memory blocks;
a subsequent processing module for invoking each of the sets of processing units other than the first set of processing units to process the subsequent processing stage after completing processing of the first stage, respectively, to write the memory blocks into a storage device, the subsequent processing stage being a next stage to a processed stage,
wherein each of the sets of processing units correspondingly processes one stage of the memory dump processing.

A memory dump system is provided in an embodiment of the present application, comprising memory and at least two processing units, and an apparatus for memory dump processing provided according to the embodiment of the present application.

It can be seen from the above technical solutions that, a method and an apparatus for memory dump processing and a memory dump system are provided in the embodiments of the present application, in which through invoking a first set of processing units to process a first stage of memory dump processing for each of the memory blocks, the dump processing for each of the memory blocks can be triggered one by one, thereby achieving the serial write of each of the memory blocks into a storage device through disk I/O and avoiding instantaneous peak flow of disk I/O transmission, the driver of the storage device does not need to be reentrant, thus improving memory dump performance. Further, in the embodiments of the present application, each corresponding set of processing units is invoked respectively to process subsequent processing stage for each memory block, allowing each set of processing units to process each stage for each memory block in a pipeline manner, thus improving utilization efficiency of the processing units and avoiding resource waste.

BRIEF DESCRIPTION OF THE DRAWINGS

In order to illustrate the embodiments of the present application or technical solutions in the prior art more clearly, accompanying drawings that are required in the description of those embodiments or the prior art will be briefly introduced below. Obviously, the accompanying drawings in the following description merely illustrate some embodiments of the present application, and other accompanying drawings can be conceived based on those drawings without any inventive efforts by those skilled in the art.

DETAILED DESCRIPTION OF THE PREFERRED EMBODIMENTS

A clear and complete description will be given below to the technical solutions of the embodiments of the present application in conjunction with the accompanying drawings of those embodiments. Obviously, those embodiments are merely a portion of but not all of possible embodiments of the present application. Based on the embodiments of the present application, other embodiments may occur to those skilled in the art without any inventive efforts, all of which are encompassed in the protection scope of the present application.

Embodiment 1

Figure 1:
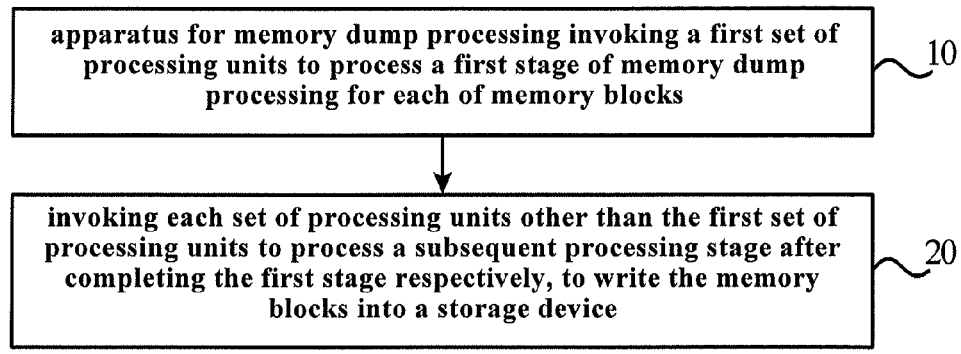
FIG. 1 is a flowchart of a method for memory dump processing provided in embodiment 1 of the present application.

FIG. 1 is a flowchart of a method for memory dump processing provided in embodiment 1 of the present application. As shown in FIG. 1, the method for memory dump processing provided in the present embodiment may be specifically applied to a system having multiple processing units (i.e., multiple logical CPUs). After the operating system (OS) of that system crashes, an apparatus for memory dump processing of the OS may control each of the processing units to perform memory dump using this method for memory dump processing. The apparatus for memory dump processing can be implemented in a form of hardware and software and can be integrated into a control apparatus of the OS, or can be provided independently.

The method for memory dump processing of this embodiment comprises the following steps.

At step 10, the apparatus for memory dump processing invokes a first set of processing units to process a first stage of memory dump processing for each of the memory blocks.

Specifically, the memory has been partitioned into multiple memory blocks, wherein the partition can be carried out according to various preset rules. The dump processing of each of the memory blocks generally involves at least two stages. For example, typical stages may comprise preprocessing, filtering, compressing and writing disk, etc. Each stage for the memory blocks is processed in a certain order, only after the processing of a previous stage has been finished, a next stage can be processed. In the technical solution employed in this embodiment, a corresponding set of processing units is assigned for each stage, and the number of processing units in each set can be assigned depending on the actual processing speed of the processing units, and can be one or more. For example, the set of processing units corresponding to the preprocessing stage comprises one processing unit, the set of processing units corresponding to the filtering stage comprises one processing unit, the set of processing units corresponding to the compressing stage comprises three processing units, and the set of processing units corresponding to the writing disk stage comprises one processing unit, in order to maintain a relatively consistent processing progress for each of the stages. A first set of processing units corresponding to a first stage is invoked at step 10 above to process the first stage for each of the memory blocks, specifically, to process each of the memory blocks according to a set order.

At step 20, each of the sets of processing units other than the first set of processing units is invoked to process the subsequent processing stages after completing the first stage respectively to write the memory blocks into a storage device, the subsequent processing stage is a next stage to a processed stage.

Wherein each of the sets of processing units corresponds to one stage of memory dump processing. The first set of processing units is the set of processing units corresponding to a first stage, and is invoked to process the first stage for each of the memory blocks, after the first set of processing units has completed the processing of the first stage for a memory block, the first stage becomes a processed stage, and only by then, other sets of processing units can be invoked to process in sequence the subsequent stages for that memory block, while at this point, the first set of processing units can continuously process the first stage for a next memory block. With the progress of dump, a subsequent processing stage may occur in each memory block, which may correspond to a different stage, and the apparatus for memory dump may invoke different sets of processing units to process those subsequent stages simultaneously.

The method for memory dump processing will be described below by means of an example, in which the memory dump processing of memory blocks comprises four stages: preprocessing, filtering, compressing and writing disk. The sets of processing units corresponding to these four stages are a first set of processing units, a second set of processing units, a third set of processing units, and a fourth set of processing units respectively. The particular procedure of memory dump performed through the method for memory dump processing provided in this embodiment is as follow: at first, the first set of processing units is invoked to process the preprocessing stage for a first memory block, after completing the processing of the preprocessing stage, the preprocessing stage becomes a processed stage, and the filtering stage for the first memory block is the subsequent processing stage. At this point, according to the sequence of memory blocks, the first set of processing units is invoked to process the preprocessing stage for a second memory block, at the same time, the second set of processing units can be invoked to process the filtering stage for the first memory block. After completing the filtering stage for the first memory block, the compressing stage becomes the subsequent processing stage, and after completing the preprocessing stage for the second memory block, the filtering stage becomes the subsequent processing stage. At this point, according to the sequence of memory blocks, the first set of processing units is invoked to process the preprocessing stage for a third memory block, at the same time, the third set of processing units is invoked to process the compressing stage for the first memory block, and the second set of processing units is invoked to process the filtering stage for the second memory block. Subsequent operation procedures are performed similarly, after completing the compressing stage for the first memory block, the fourth set of processing units is invoked to process the writing disk stage for the first memory block to write the first memory block into the storage device, until then the dump processing of the first memory block is finished. The third set of processing units is invoked to process the compressing stage for the second memory block after completing the filtering stage of the second memory block; after the completing the preprocessing stage for the third memory block, the second set of processing units is invoked to process the filtering stage for the third memory block, at the same time, the first set of processing units is invoked to process the preprocessing stage for a fourth memory block. Thus, a pipeline processing of each stage for each of the memory blocks is achieved in sequence, by which all the memory blocks are written into the storage device through disk I/O in sequence.

Through invoking the first set of processing units to process the first stage for each of the memory blocks, the method for memory dump processing provided in this embodiment can trigger the dump processing of each of the memory blocks one by one, thereby achieving the serial writing of each of the memory blocks into a storage device through disk I/O and avoiding instantaneous peak flow of disk I/O transmission, the driver of the storage device does not need to be reentrant, and memory dump performance is improved. Furthermore, in this embodiment, a corresponding set of processing units is invoked to process a subsequent processing stage for each of the memory blocks respectively, which can realize processing each stage for each of the memory blocks by each set of processing units in a pipeline manner, thus improving utilization efficiency of the processing units and avoiding resource waste.

Embodiment 2

Figure 2:
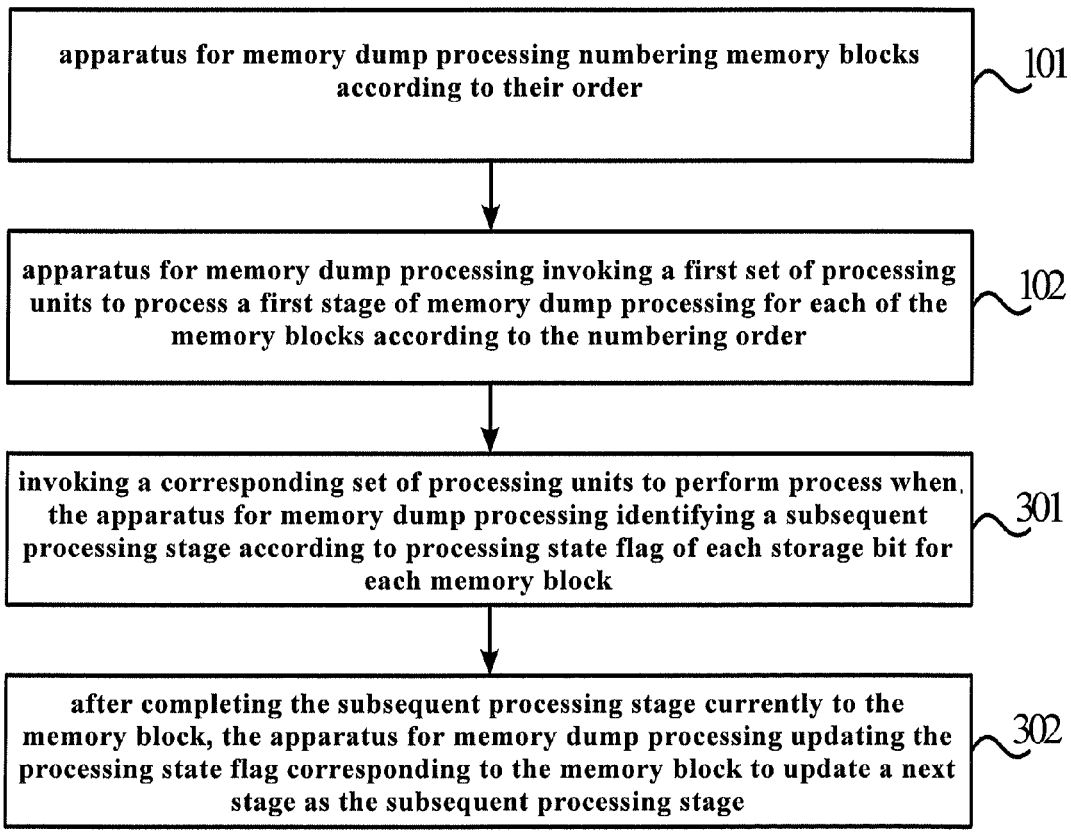
FIG. 2 is a flowchart of a method for memory dump processing provided in embodiment 2 of the present application.

FIG. 2 is a flowchart of a method for memory dump processing provided in embodiment 2 of the present application. The present embodiment differs from embodiment 1 in that, step 20 of the above embodiment of invoking each of the sets of processing units other than the first set of processing units to process a subsequent stage after completing the first stage respectively may specifically comprise: when the apparatus for memory dump processing identifies that there has subsequent processing stage for the memory blocks, invoking a corresponding set of processing units to process the subsequent processing stage, and after completing the process, updating a next stage as the subsequent stage.

Through identifying and updating the subsequent stage for the memory blocks, the pipeline processes of each stage for each of the memory blocks can be synchronized.

In the present embodiment, the stages may specifically comprise preprocessing stage, filtering stage, compressing stage and writing disk stage. The preprocessing stage, filtering stage, compressing stage and writing disk stage are processed in sequence, and the first stage is preprocessing stage, and the subsequent processing stage is filtering stage, compressing stage or writing disk stage. For example, after completing the preprocessing stage as the first stage, filtering stage becomes the subsequent processing stage, and after completing the filtering stage, the compressing stage becomes the subsequent stage, and so on. The arrangement of stages can be set depending on the practical requirement of memory dump, and is not limited to this embodiment.

In the present embodiment, preferably, a storage bit is correspondingly provided for each stage of each of the memory blocks for storing a processing state flag, when the apparatus for memory dump processing identifies that a memory block has a subsequent processing stage, a corresponding set of processing units is invoked to perform a corresponding process, and after completing the process, the operation of updating a next stage as the subsequent processing stage may specifically comprise the following steps:

step 301: when the apparatus for memory dump processing identifies the subsequent processing stage according to the processing state flag of each storage bit for each of the memory blocks, the corresponding set of processing units is invoked to perform process;

step 302: after completing the subsequent processing stage currently to the memory block, the apparatus for memory dump processing updates the processing state flag corresponding to the memory block to update a next stage as the subsequent processing stage.

Specifically, the processing state flag is used to indicate whether a certain stage of a memory block has been completed. Specifically, storage bit can be provided in a preserved storage area of the memory, which is not invoked during the normal operation of the system, and only when memory dump is needed due to system crash, the storage bit in the preserved storage area is used to store the processing state flag. The storage bit can also be provided in other storage units, so long as it can be used to store processing state flag in the case of system crash and is not limited to the present embodiment. A method for setting a storage bit may be specifically as follow.

Given that the memory is partitioned into totally 1024 memory blocks and each of the memory blocks needs to be processed in four stages, it is necessary to provide three processing state flags for each of the memory blocks, which correspond to the processing states of the first three stages respectively. If the state of a certain stage is unprocessed, the processing state flag corresponding to that stage is "0"; after completing the process of that stage, the processing state flag corresponding to that stage is updated to "1"; thereby, a next stage to that stage for the memory block can be processed, achieving the synchronization operation of various stages. Storing one processing state flag by one storage bit totally needs 1024*3=3072 storage bits, and a preserved area of at least 384 bytes is needed if one storage bit has 1 bit. Before starting memory dump operation, specifically, the processing state flags of all storage bits in the preserved storage area can be initialized to "0" in order to update those processing state flags to synchronize various stages during memory dump.

Through setting processing state flags, in the case of system crash, errors occurred due to synchronizing various stages in the pipeline process with system signal amount can be avoided, the accuracy of memory dump processing is improved, and memory dump performance is further improved. The synchronization of various stages in the pipeline process also can be realized with data structures such as queue, stack, etc, and is not limited to the present embodiment.

In the present embodiment, the apparatus for memory dump processing invoking a first set of processing units to process a first stage of memory dump processing for each of the memory blocks of step 10 may specifically comprises:

step 101: the apparatus for memory dump processing numbers the memory blocks according to their order;

step 102: the apparatus for memory dump processing invokes a first set of processing units to process the first stage of memory dump processing for each of the memory blocks according to its numbered order.

Through numbering the memory blocks according to their order, and invoking the first set of processing units to process the first stage of memory dump processing for each of the memory blocks according to its numbered order, subsequent processing stages are also processed for each of the memory blocks according to its order, as a result, file data in memory can be recovered without any special process after writing the memory blocks into the storage device.

Embodiment 3

Figure 3:
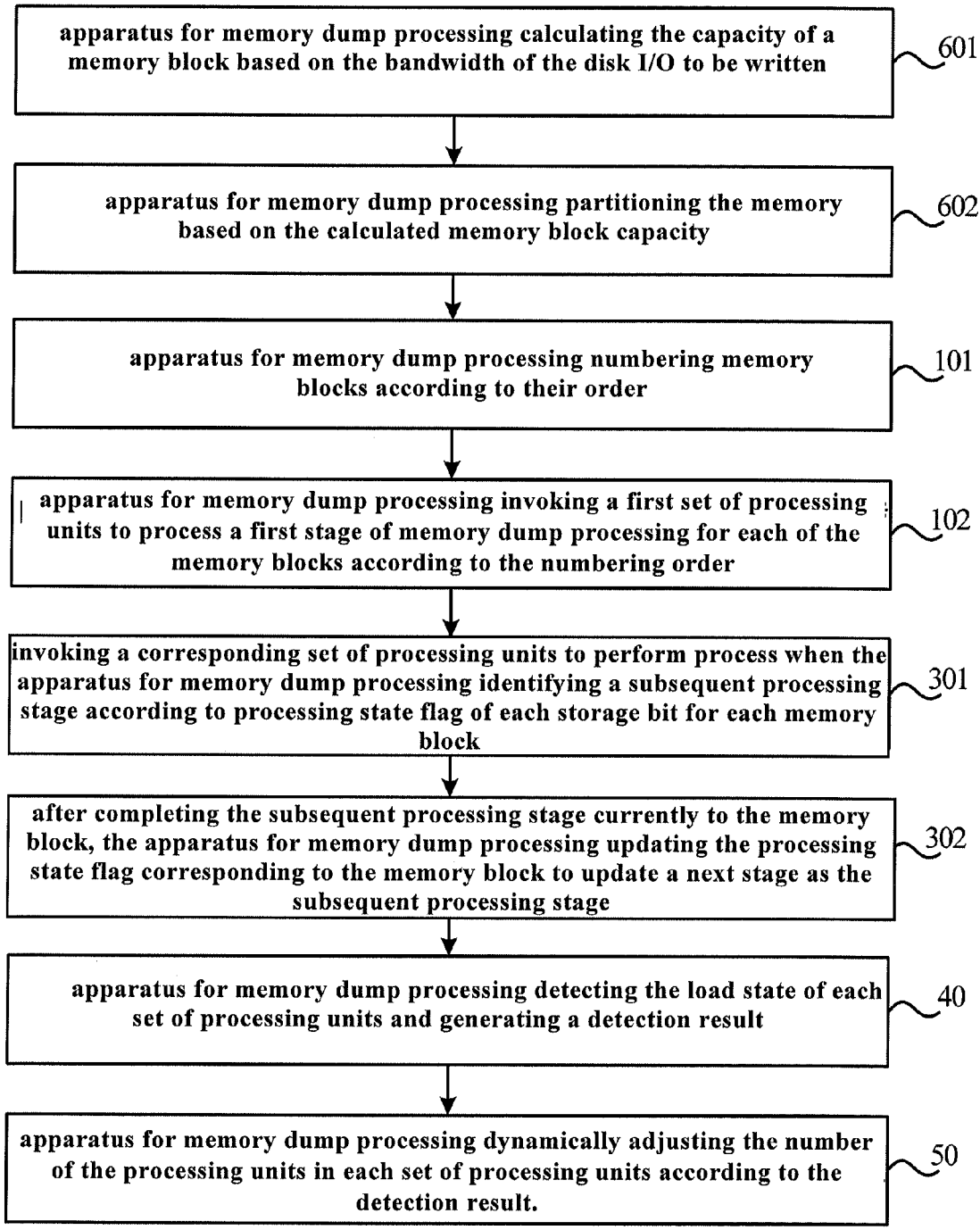
FIG. 3 is a flowchart of a method for memory dump processing provided in embodiment 3 of the present application.

FIG. 3 is a flowchart of a method for memory dump processing provided in embodiment 3 of the present application. The method for memory dump processing provided in this embodiment may specifically further comprise the following steps:

step 40: the apparatus for memory dump processing detects load state of each of the sets of processing units and generates a detection result;

step 50: the apparatus for memory dump processing dynamically adjusts the number of processing units in each of the sets of processing units according to the detection result.

Through detecting the load state of each of the sets of processing units, it is possible to dynamically assign processing units for each stage to keep the balance of the processing procedure and avoid the occurrence of bottleneck. Specifically, it can be set in advance that the set of processing units corresponding to preprocessing stage comprises one processing unit, the set of processing units corresponding to filtering stage comprises one processing unit, the set of processing units corresponding to compressing stage comprises three processing units, and the set of processing units corresponding to writing disk stage comprises one processing unit. During memory dump, the number of processing units in each of the sets of processing units can be dynamically adjusted according to the load state of each of the sets of processing units, and when the processing speed of compressing stage is too fast and the processing speed of filtering stage is relatively slow, the operation of one of the three processing units for the compressing stage can be stopped to release the resource of that processing unit, and that processing unit can be used in the process of the filtering stage. It is also possible to set in advance that the number of processing units in each of the sets of processing units corresponding to each of the stages is 1, and during memory dump, the number of processing units in each of the sets of processing units is dynamically adjusted according to the load state of each of the sets of processing units. It is noted that, the steps that the apparatus for memory dump processing detects the load state of each of the sets of processing units, and adjusts the number of processing units in each of the sets of processing units can be carried out during the memory dump, and do not necessarily have a timing relationship with the above steps of memory dump.

In this embodiment, preferably, the step 40 that the apparatus for memory dump processing detects the load state of each of the sets of processing units and generates a detection result may specifically comprise:

the apparatus for memory dump processing detecting the average time of processing a stage corresponding to a set number of memory blocks by each of the sets of processing units as the detection result.

Through detecting the average time of processing a stage corresponding to a set number of memory blocks by each of the sets of processing units as the detection result, the load state of each of the processing units is reflected, the operation is simple and easy to realize.

In this embodiment, when the subsequent processing stage is the writing disk stage, each of the sets of processing units other than the first set of processing units is invoked to process the subsequent processing stages after completing the first stage respectively to write the memory blocks into a storage device may specifically comprise the following step:

the apparatus for memory dump processing invokes the set of processing units corresponding to the writing disk stage to perform the process of the writing disk stage according to the number of disk I/Os and memory block numbers, so as to write the memory blocks into the storage device through disk I/Os.

Multiple disk I/Os may be available in practical application. The process of writing disk stage may be performed according to the number of disk I/Os and memory block numbers when writing memory blocks into a storage device through multiple disk I/Os, so as to ensure the storage order of the memory blocks in the storage device.

In this embodiment, preferably, performing the process of the writing disk stage according to the number of disk I/Os and memory block numbers to write memory blocks into a storage device through multiple disk I/Os may specifically comprise the following step:

taking modulus of a memory block number and the number of disk I/Os, and writing the memory block into the storage device through a corresponding disk I/O according to the result of taking modulus.

Specifically, for example, the memory block number is 1 to 1024, the number of disk I/Os is 2, that is, disk I/O 0 and disk I/O 1. The memory block 1 is numbered by 1 and is written into the storage device through disk I/O 1 since 1 modulo 2=1; the memory block 2 is numbered by 2 and is written into the storage device through disk I/O 0 since 2 modulo 2=0.

In the present embodiment, before the apparatus for memory dump processing invoking a first set of processing units to process the first stage of memory dump processing for each of the memory blocks at the step 10, there specifically may comprise a step of partitioning memory blocks:

at step 60, the apparatus for memory dump processing partitioning the memory into at least two memory blocks according to the bandwidth of the disk I/O to be written.

Partitioning the memory according to the bandwidth of the disk I/O to be written may avoid decrease of the memory dump performance due to disk I/O congestion.

In this embodiment, preferably, the apparatus for memory dump processing partitioning the memory into at least two memory blocks according to the bandwidth of the disk I/O to be written at step 60 may specifically comprise:

step 601: the apparatus for memory dump processing calculating the capacity of a memory block based on the bandwidth of the disk I/O to be written, wherein the capacity of the memory block subjected to various stages before the writing disk stage is not larger than the bandwidth of the disk I/O;

step 602: the apparatus for memory dump processing partitioning the memory based on the calculated capacity of the memory block.

For example, if the bandwidth of the disk I/O to be written is 20 M/s, the ratio of the filtering stage is 50%, and the ratio of compressing stage is 50%, the capacity of the partitioned memory block is 20/50%/50%=80M, and the bandwidth of the disk I/O can be effectively utilized through partitioning the memory based on that capacity of the memory block.

Embodiment 4

Figure 4:
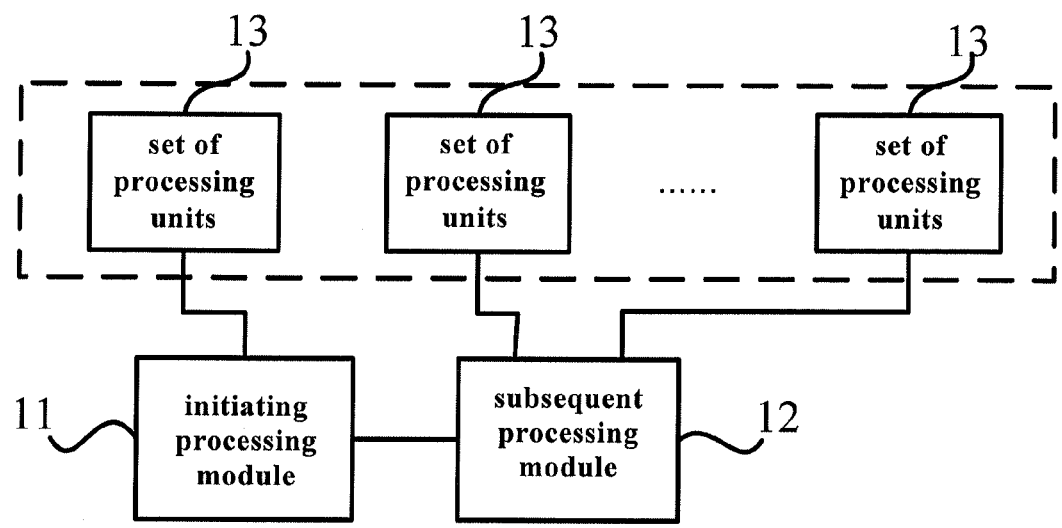
FIG. 4 is a structural diagram of an apparatus for memory dump processing provided in embodiment 4 of the present application.

FIG. 4 is a structural diagram of an apparatus for memory dump processing provided in embodiment 4 of the present application. As shown in FIG. 4, the apparatus for memory dump processing provided in this embodiment may specifically implement the method for memory dump processing provided in any embodiment of the present application, but is not limited thereto.

The apparatus for memory dump processing provided in this embodiment comprises a initiating process module 11 and a subsequent process module 12. The initiating process module 11 is used to invoke a first set of processing units to process a first stage of memory dump processing for each of the memory blocks. In the technical solution applied in this embodiment, the apparatus for memory dump processing can assign a corresponding set of processing units 13 for each stage in advance, the number of processing units in each of the sets of processing units can be assigned according to the practical processing speed of the processing units, which can be one or more. The subsequent process module 12 is used to invoke each of the sets of processing units other than the first set of processing units to process the subsequent processing stage after completing the first stage so as to write the memory blocks into a storage device, the subsequent stage being a next stage to a processed stage. Each of the sets of processing units correspondingly processes one stage of the memory dump processing.

Through providing the initiating process module 11 to invoke a first set of processing units to process a first stage for each of the memory blocks, the apparatus for memory dump processing of this embodiment can trigger dump processing for each of the memory blocks one by one, thereby achieving the serial writing of each of the memory blocks to a storage device through disk I/O, instantaneous peak flow of disk I/O transmission is avoid, the driver of the storage device dose not need to be reentrant, and the memory dump performance is improved. Further, in this embodiment, through providing the subsequent process module 12 to invoke each corresponding set of processing units to process a subsequent stage of each of the memory blocks respectively, it is allowed to process each dump stage for each of the memory blocks by each set of processing units 13 in a pipeline manner, thereby improving utilization efficiency of the processing units and avoiding resource waste.

Embodiment 5

Figure 5:
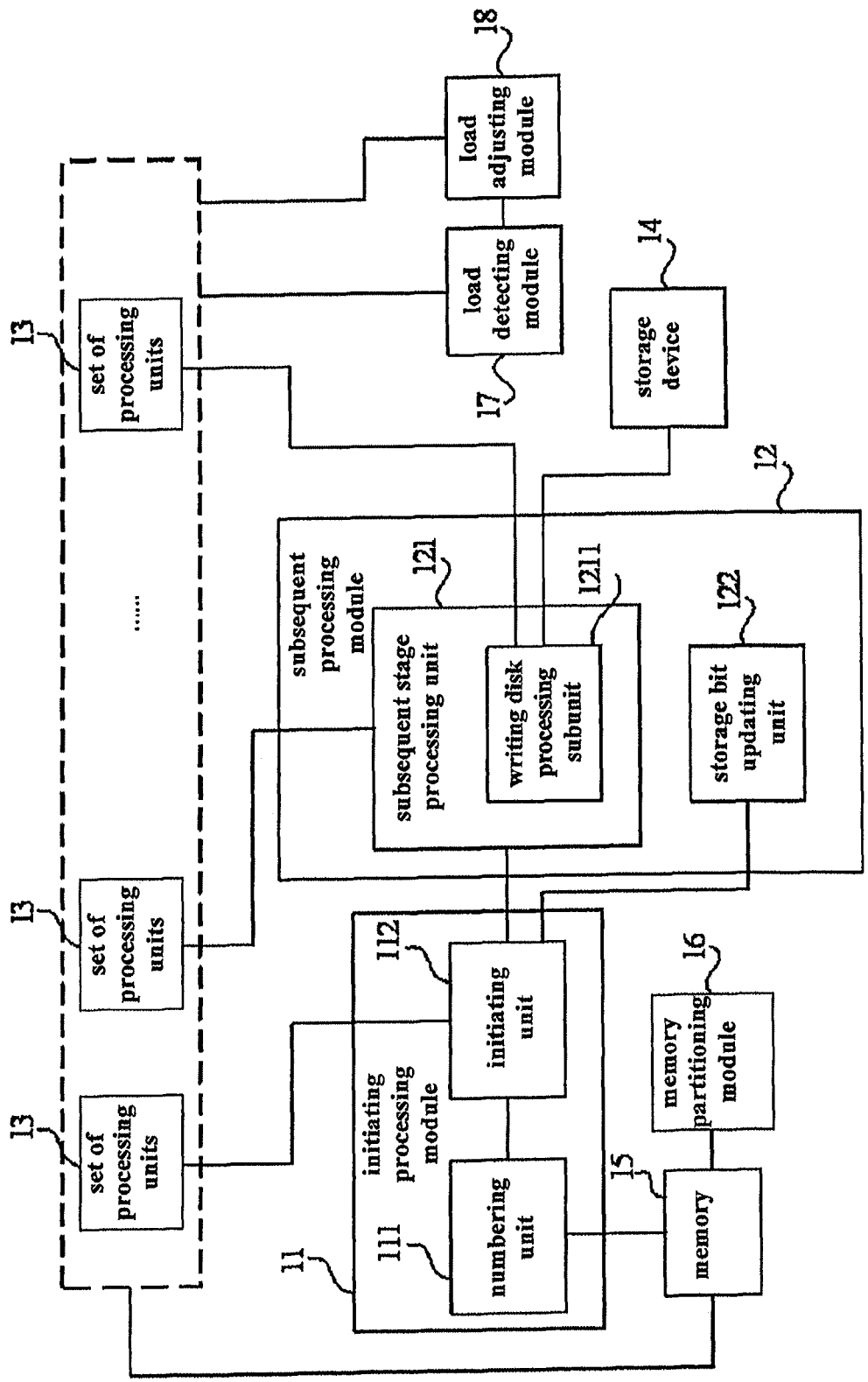
FIG. 5 is a structural diagram of an apparatus for memory dump processing provided in embodiment 5 of the present application.

FIG. 5 is a structural diagram of an apparatus for memory dump processing provided in embodiment 5 of the present application. In this embodiment, a storage bit is provided for each stage of each of the memory blocks, for storing a processing state flag which is specifically used to indicate whether a certain stage of a certain memory block has been completed. The storage bit can be specifically provided in a preserved memory area of the memory 15 which is not invoked during the normal operation of the system. The storage bits in the preserved storage area are used to store processing state flags only when memory dump is needed due to system crash. The storage bits can be provided in other storage units, so long as they can be used to store processing state flags in the case of system crash. This embodiment is not intended to be limiting.

The subsequent process module 12 of the apparatus for memory dump processing provided in this embodiment may comprise a subsequent stage processing unit 121 and a storage bit updating unit 122. The subsequent stage processing unit 121 is used to invoke a corresponding set of processing units to perform a process when a subsequent stage is identified based on the processing state flag of each storage bit of each of the memory blocks. The storage bit updating unit 122 is used to update the processing state flag corresponding to memory block to update a next stage as the subsequent processing stage after completing the subsequent processing stage currently to the memory block.

Through providing processing state flags, in the case of system crash, errors occurred due to synchronizing various stages in the pipeline process by means of system signal amount can be avoided, accuracy of the memory dump processing is improved and memory dump performance is further improved. The synchronization of various stages in the pipeline process also can be realized with data structures such as queue, stack, etc, and is not limited to this embodiment.

In this embodiment, the initiating process module 11 may specifically comprise a numbering unit 111 for numbering the memory blocks according to their order, and an initiating unit 112 for invoking a first set of processing units to process the first stage of memory dump processing for each of the memory blocks according to their numbering order.

Through numbering memory blocks according to the order of each of the memory blocks by the numbering unit 111, and invoking the first set of processing units to process the first stage of memory dump processing for each of the memory blocks according to their numbering order by the initiating unit 112, subsequent stages are also processed for each of the memory blocks according to their order, as a result, file data in the memory can be recovered without any special process upon writing the memory blocks into the storage device 14.

In this embodiment, the apparatus for memory dump processing may specifically further comprise a load detecting module 17 for detecting the load state of each set of processing units and generating a detection result, and a load adjusting module 18 for dynamically adjusting the number of processing units in each set of processing units according to the detection result.

Through detecting the load state of each set of processing units by the load detecting module 17, the load adjusting module 18 can dynamically assign processing units for each stage, thereby keeping the balance of the processing procedure, avoiding the occurrence of bottleneck and efficiently using the processing resource.

In this embodiment, preferably, the load detecting module 17 may detect the average time of processing stages corresponding to a set number of memory blocks by each set of processing units as the detection result. Through detecting the average time of processing stages corresponding to a set number of memory blocks by each set of processing units as the detection result to reflect the load state of each processing unit, the operation is simple and easy to realize.

In this embodiment, the subsequent stage processing unit 121 at least comprises a writing disk processing subunit 1211 for, when a subsequent stage which is the writing disk stage is identified based on the processing state flag of each storage bit of each of the memory blocks, invoking the set of processing units corresponding to the writing disk stage to perform process and instructing to perform the process of the writing disk stage according to the number of disk I/Os and memory block numbering, so as to write the memory blocks into the storage device 14 through disk I/O.

Multiple disk I/Os may be available in practical applications. When writing memory blocks into the storage device 14 through multiple disk I/Os, the writing disk subunit 1211 may instruct a set of processing units 13 corresponding to the writing disk stage to perform the process of the writing disk stage according to the number of disk I/Os and memory block numbering, so as to ensure the storage order of the memory blocks in the storage device.

In this embodiment, the apparatus for memory dump processing may further comprise a memory partitioning module 16 for partitioning the memory 15 into at least two memory blocks according to the bandwidth of the disk I/O to be written. Partitioning the memory 15 according to the bandwidth of the disk I/O to be written may avoid lowering memory dump performance due to disk I/O congestion.

Embodiment 6

Figure 6:
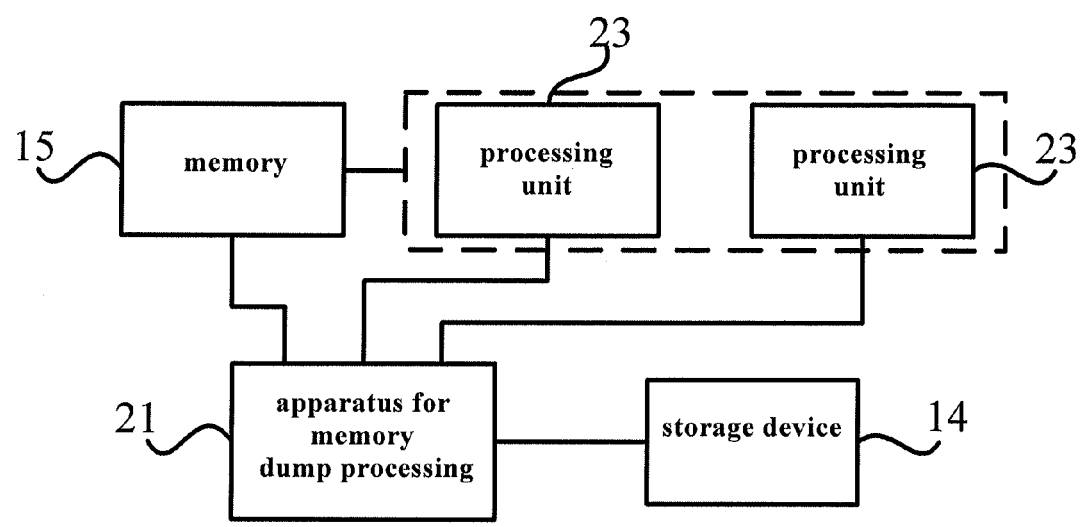
FIG. 6 is a structural diagram of a memory dump system provided in embodiment 6 of the present application.

FIG. 6 is a structural diagram of a memory dump system provided in embodiment 6 of the present application. As shown in FIG. 6, the memory dump system provided in this embodiment comprises memory 15 and at least two processing units 23, it may further comprise the apparatus for memory dump processing 21 provided in any embodiment of the present application. The above embodiments can be consulted for the specific operations of dumping the memory 15 through invoking the processing units 23 by the apparatus for memory dump processing 21 in the memory dump system provided in this embodiment, which will not be described in detail herein.

The memory dump system provided in this embodiment can trigger dump processing for each of the memory blocks one by one, so as to achieve serially writing each of the memory blocks into a storage device 14 through disk I/O, instantaneous peak flow of disk I/O transmission is avoided, the driver of the storage device 14 does not need to be reentrant, and memory dump performance is improved. Further, each stage for each memory block can be processed by each set of processing units 13 in a pipeline manner, thereby improving the utilization efficiency of the processing units and avoiding resource waste.

The method and apparatus for memory dump processing and memory dump system provided in the embodiments of the present application achieve serial dump for memory blocks through the cooperation of multiple processing units, so that peak disk I/O traffic is dispersed into multiple stages, instantaneous peak flow of disk I/O transmission is avoided, the driver of the storage device does not need to be reentrant, and memory dump performance is improved. Serial dump of memory files can be achieved, and a simple processing principle is provided for multiple disk I/Os. The number of the processing units in each set of processing units is dynamically adjusted according to the load state of each stage, thereby avoiding the occurrence of bottleneck, and achieving the efficient utilization of system resources.

Those ordinary skilled in the art may appreciate that all or some of the steps of the above method embodiments can be realized by hardware relative to program instructions, the program previously mentioned can be stored in a computer readable storage medium, when being executed, the program can implement the steps of the above method embodiment; the storage medium previously mentioned comprises: various medium that can store program codes such as ROM, RAM, magnetic disk or optical disk.

At last, it should be noted that the above embodiments are merely used to illustrate the technical solutions of the present application and are not limiting; although the present application has been described in detail with reference of the above embodiments, those ordinary skilled in the art may appreciate that it is possible to make modifications to the technical solutions described in the previous embodiments or make equivalent substitutions to some technical features therein; and corresponding technical solutions with those modifications and substitutions fall in the spirit and scope of the technical solutions of various embodiments of the present application.

What is claimed is:

1. A method for memory dump processing, comprising:
    logically dividing a central processing unit (CPU) into a plurality sets of identical logical processing units;
    invoking a first set of logical processing units from the plurality of identical logical processing units to process a first stage of memory dump processing for each of memory blocks;
    invoking each subsequent set of logical processing units other than the first set of logical processing units to process a subsequent processing stage after completing the first stage respectively; and
    writing the memory blocks into a storage device, wherein the subsequent processing stage being a next stage to a processed stage, wherein said each of the plurality sets of identical logical processing units correspondingly processes one stage of the memory dump processing, so as to avoid a peak flow of I/O data transmission into the storage device.

2. The method for memory dump processing according to claim 1, wherein the invoking of each subsequent set of logical processing units other than the first set of logical processing units to process a subsequent processing stage after completing the first stage respectively, comprising:
    when it is identified that the memory blocks have the subsequent processing stage, invoking a corresponding set of logical processing units to perform the memory dump processing, and after completing the memory dump processing, updating a next stage as the subsequent processing stage.

3. The method for memory dump processing according to claim 2, wherein a storage bit is correspondingly provided for each stage of each of the memory blocks for storing a processing state flag, and
    when it is identified that the memory blocks have the subsequent processing stage, invoking a corresponding set of logical processing units to perform the memory dump processing, and
    after completing the memory dump processing, the updating of the next stage as the subsequent processing stage comprising:
        when the subsequent processing stage is identified according to the processing state flag of each storage bit for each memory block, invoking a corresponding set of logical processing units to perform the memory dump processing;
    after completing the subsequent processing stage currently to the memory block, updating the processing state flag corresponding to the memory block to update a next stage as the subsequent processing stage.

4. The method for memory dump processing according to claim 1, wherein the invoking of the first set of logical processing units to process the first stage of memory dump processing for each of memory blocks comprising:
    numbering the memory blocks according to their order;
    invoking the first set of logical processing units to process the first stage of memory dump processing for each of the memory blocks according to the numbering order.

5. The method for memory dump processing according to claim 1, further comprising:
    detecting a load state of each set of logical processing units and generating a detection result;
    dynamically adjusting a number of the logical processing units in the each set of logical processing units according to the detection result.

6. The method for memory dump processing according to claim 5, wherein the detecting of the load state of the each set of logical processing units and the generating of the detection result comprising:
    detecting an average time of processing a corresponding stage of a set number of memory blocks by the each set of logical processing units as the detection result.

7. The method for memory dump processing according to claim 4, wherein when the subsequent logical processing stage is a writing disk stage, the invoking of the each set of logical processing units other than the first set of logical processing units to process the subsequent logical processing stage after completing the first stage respectively, and the writing of the memory blocks into the storage device comprising:
    invoking the set of logical processing units corresponding to the writing disk stage in order to perform the process of the writing disk stage according to a number of disk I/Os and memory block numbering, in order to write the memory blocks into the storage device through the disk I/Os.

8. The memory dump method according to claim 7, wherein the performing of the process of the writing disk stage according to the number of disk I/Os and memory block numbering, in order to write the memory blocks into the storage device through the disk I/Os comprising:
    taking modulus of memory block numbering and the number of disk I/Os, and writing the memory block into the storage device through a corresponding disk I/O according to the result of modulus taking.

9. The memory dump method according to claim 1, wherein before the invoking of the first set of logical processing units to process a first stage of memory dump processing for each of the memory blocks, the method further comprising:
  partitioning a memory into at least two memory blocks according to a bandwidth of disk I/Os to be written.

10. The method for memory dump processing according to claim 9, wherein the partitioning of the memory into the at least two memory blocks according to the bandwidth of the disk I/Os to be written, comprising:
  calculating capacity of the memory block based on the bandwidth of the disk I/Os to be written, wherein the capacity of the memory block subjected to various stages before a writing disk stage is not larger than the bandwidth of the disk I/Os; and
  partitioning the memory based on the calculated memory block capacity.

11. The method for memory dump processing according to claim 1, wherein:
  the stages comprise a preprocessing stage, a filtering stage, a compressing stage, and a writing disk stage;
  the preprocessing stage, the filtering stage, the compressing stage, and the writing disk stage being processed in order;
  the first stage being the preprocessing stage, and the subsequent processing stage being the filtering stage, the compressing stage, or the writing disk stage.

12. An apparatus for memory dump processing, comprising:
  a central processing unit (CPU) logically divided into a plurality sets of identical logical processing units;
  an initiating processing module, which invokes a first set of logical processing units from the plurality of identical logical processing units to process a first stage of memory dump processing for each of memory blocks;
  a subsequent processing module, which invokes each subsequent set of logical processing units other than the first set of logical processing units to process a subsequent processing stage after the completing the first stage respectively, in order to write the memory blocks into a storage device, wherein the subsequent processing stage being a next stage to a processed stage,
  wherein each of the plurality sets of identical logical processing units correspondingly processes one stage of the memory dump processing, so as to avoid a peak flow of I/O data transmission into the storage device.

13. The apparatus for memory dump processing according to claim 12, wherein a storage bit is provided for each stage of each memory block for storing a processing state flag, and the subsequent processing module comprises:
  a subsequent stage processing unit, which invokes a corresponding set of logical processing units to perform the memory dump processing when the subsequent processing stage is identified based on the processing state flag of each storage bit of every memory block;
  a storage bit updating unit, which updates the processing state flag corresponding to the memory block to update a next stage as the subsequent processing stage after completing the subsequent processing stage currently to the memory block.

14. The apparatus for memory dump processing according to claim 12 wherein the initiating processing module comprises:
  a numbering unit, which numbers the memory blocks according to their order; and
  an initiating unit, which invokes the first set of logical processing units to process the first stage of memory dump processing for each of the memory blocks according to the numbering order.

15. The apparatus for memory dump processing according to claim 12, wherein further comprising:
  a load detecting module, which detects a load state of each set of logical processing units and generating a detection result; and
  a load adjusting module, which dynamically adjusts a number of logical processing units in the each set of logical processing units according to the detection result.

16. The apparatus for memory dump processing according to claim 14, wherein:
  the subsequent stage logical processing unit at least comprises a writing disk subunit such that, when the subsequent processing stage is identified based on the processing state flag of each storage bit of each of the memory blocks and the subsequent processing stage is the writing disk stage, invokes the set of logical processing units corresponding to the writing disk stage to perform the memory dump processing and instructing to perform the memory dump processing of the writing disk stage according to a number of disk I/Os and memory block numbering, so as to write the memory blocks into the storage device through the disk I/Os.

17. The apparatus for memory dump processing according to claim 12, further comprising:
  a memory partitioning module, which partitions a memory into at least two memory blocks according to bandwidth of disk I/Os to be written.

18. A memory dump system, comprising a memory and a central processing unit (CPU) logically divided into at least two sets of identical logical processing units for memory dump processing, comprising:
  an initiating processing module, which invokes a first set of logical processing units to process a first stage of memory dump processing for each of memory blocks;
  a subsequent processing module which invokes each set of logical processing units other than the first set of logical processing units to process a subsequent processing stage after the completing the first stage respectively, in order to write the memory blocks into a storage device, the subsequent processing stage being a next stage to a processed stage,
  wherein each set of logical processing units correspondingly processes one stage of the memory dump processing, so as to avoid a peak flow of I/O data transmission into the storage device.

* * * * *